US008751930B2

(12) United States Patent  
Jhoney et al.

(10) Patent No.: US 8,751,930 B2
(45) Date of Patent: Jun. 10, 2014

(54) SEAMLESSLY SHARING AND REUSING KNOWLEDGE BETWEEN AN ADMINISTRATOR CONSOLE AND USER INTERACTION

(75) Inventors: Albee Jhoney, Bangalore (IN); Prasanna Lakshminarasimhan Venkatesan Thayyar, Nanganallur (IN)

(73) Assignee: International Business Machines Corporation, Armonk, NY (US)

( * ) Notice: Subject to any disclaimer, the term of this patent is extended or adjusted under 35 U.S.C. 154(b) by 256 days.

(21) Appl. No.: 12/938,174

(22) Filed: Nov. 2, 2010

(65) Prior Publication Data

US 2012/0110448 A1    May 3, 2012

(51) Int. Cl.
    *G06F 3/00*    (2006.01)
    *G06F 15/177*  (2006.01)

(52) U.S. Cl.
    USPC ........... 715/704; 715/705; 715/708; 715/762; 709/220

(58) Field of Classification Search
    CPC ............. G06F 9/4446; G06F 17/3089; G06F 17/30873; H04L 29/08846; H04L 43/50
    USPC ........................... 715/704, 762, 708; 709/220
    See application file for complete search history.

(56) References Cited

U.S. PATENT DOCUMENTS

| | | | | |
|---|---|---|---|---|
| 7,606,878 B2 * | 10/2009 | Dumm | ........................... | 709/220 |
| 8,104,078 B2 * | 1/2012 | Padmanabhuni et al. | ....... | 726/12 |
| 8,239,239 B1 * | 8/2012 | Malhotra et al. | ............. | 705/7.27 |
| 2002/0038388 A1 * | 3/2002 | Netter | ........................... | 709/318 |
| 2004/0130572 A1 * | 7/2004 | Bala | .............................. | 345/762 |
| 2006/0136409 A1 * | 6/2006 | Leidig | ............................... | 707/4 |
| 2006/0184880 A1 * | 8/2006 | Bala | .............................. | 715/705 |
| 2006/0200794 A1 | 9/2006 | Robertson et al. | ............ | 717/103 |
| 2006/0277166 A1 * | 12/2006 | Vogler-Ivashchanka et al. | | 707/3 |
| 2007/0179646 A1 * | 8/2007 | Dempski et al. | ................ | 700/83 |
| 2007/0271273 A1 * | 11/2007 | Cradick et al. | .................. | 707/10 |
| 2007/0299631 A1 * | 12/2007 | Macbeth et al. | .............. | 702/187 |
| 2008/0198005 A1 * | 8/2008 | Schulak et al. | ............... | 340/540 |
| 2009/0064000 A1 * | 3/2009 | Garbow et al. | ............... | 715/762 |

FOREIGN PATENT DOCUMENTS

WO   WO/2008/025614    3/2008
WO   WO 2009/139994    11/2009    ............. G06F 11/30

OTHER PUBLICATIONS

Holgate et al., "The Arusha Project: A Framework for Collaborative Unix System Administration,". Proceedings of the LISA 2001 15$^{th}$ Systems Administration Conference, San Diego, CA Dec. 2-7, 2001, pp. 187-197.

(Continued)

*Primary Examiner* — Doug Hutton, Jr.
*Assistant Examiner* — Li Sun
(74) *Attorney, Agent, or Firm* — Vanleeuwen & Vanleeuwen; Parashes T. Kalaitzis

(57) ABSTRACT

An approach is provided that captures an admin-console context. The first admin-console context includes a set of state attribute values corresponding to elements that are included in a context hierarchy of a console software application that is being executed at a computer system. A number of events that occur at the admin-console are recorded in a memory. A Reusable User Interaction (RUI) Script is stored in a nonvolatile storage area. The RUI Script includes the captured admin-console context and a sequence of the recorded plurality events. A collection of RUI Scripts are stored in a central knowledge repository for reuse. Search the RUI Scripts repository for reuse, using the current admin-console context.

14 Claims, 11 Drawing Sheets

(56) References Cited

OTHER PUBLICATIONS

Hunt et al., "A Fast Algorithm for Computing Longest Common Subsequences," Association for Computing Machinery, Inc., Communications of the ACM, vol. 20, No. 5, May 1977, pp. 350-353.

"Suffr," PmWiki, published online at http://www.pmwiki.org/wiki/Cookbook/Suffr, maintained by Kirk Zurell, Feb. 2011, 3 pages.

"CoScripter, Simplifying web-based processes," published online by International Business Machines Corporation, Armonk, NY, Feb. 2008, 2 pages.

"ICEbrowser," published online by ICESOFT Technologies, Inc. at http://www.icesoft.com/products/icebrowser.html, Jan. 2009, 1 page.

"Firebug, Web Development Evolved," published online by Mozilla at http://getfirebug.com/whatisfirebug, Jan. 2005, 6 pages.

* cited by examiner

SEAMLESSLY SHARING AND REUSING KNOWLEDGE BETWEEN AN ADMINISTRATOR CONSOLE AND USER INTERACTION

TECHNICAL FIELD

The present invention relates to providing a network-based administration console to manage collective intelligence of administrators.

BACKGROUND OF THE INVENTION

Integrated Solution Console (ISC) (e.g., Tivoli Integrated Portal™, etc.) is a Web-based console technology provided by the International Business Machines Corporation that provides a consistent view and common interface tool for Web-based administration of software products and/or solutions. It is a framework and a collection of components used to create a consistent "console" experience for its users based on the work they do. Today, several products and solutions are managed using an administration console (admin-console) developed using the ISC technology. In the process, ISC has evolved in many dimensions, such functionality, footprint, and platforms (e.g., Application Server, Portal Server, OSGi runtime, etc.). An administrator, while configuring/administering a product (or solution), is typically in need of expertise or knowledge about the task (and data-inputs) while reconfiguring a product or solution. This knowledge is traditionally available in the form of documents (to search, read, interpret, and act) or experts (accessible through eMails, Instant Messaging, and the like).

SUMMARY

An approach is provided that captures an admin-console context. The first admin-console context includes a set of state attribute values corresponding to elements that are included in a context hierarchy of a console software application that is being executed at a computer system. A number of events that occur at the admin-console are recorded in a memory. A Reusable User Interaction (RUI) Script is stored in a nonvolatile storage area. The RUI Script includes the captured admin-console context and a sequence of the recorded plurality events. A collection of RUI Scripts are stored in a central knowledge repository for reuse. Search the RUI Scripts repository for reuse, using the current admin-console context.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings, wherein.

DETAILED DESCRIPTION

Certain specific details are set forth in the following description and figures to provide a thorough understanding of various embodiments of the invention. Certain well-known details often associated with computing and software technology are not set forth in the following disclosure, however, to avoid unnecessarily obscuring the various embodiments of the invention. Further, those of ordinary skill in the relevant art will understand that they can practice other embodiments of the invention without one or more of the details described below. Finally, while various methods are described with reference to steps and sequences in the following disclosure, the description as such is for providing a clear implementation of embodiments of the invention, and the steps and sequences of steps should not be taken as required to practice this invention. Instead, the following is intended to provide a detailed description of an example of the invention and should not be taken to be limiting of the invention itself. Rather, any number of variations may fall within the scope of the invention, which is defined by the claims that follow the description.

The following detailed description will generally follow the summary of the invention, as set forth above, further explaining and expanding the definitions of the various aspects and embodiments of the invention as necessary. To this end, this detailed description first sets forth a computing environment in FIG. 1 that is suitable to implement the software and/or hardware techniques associated with the invention. A networked environment is illustrated in FIG. 2 as an extension of the basic computing environment, to emphasize that modern computing techniques can be performed across multiple discrete devices.

Figure 1:
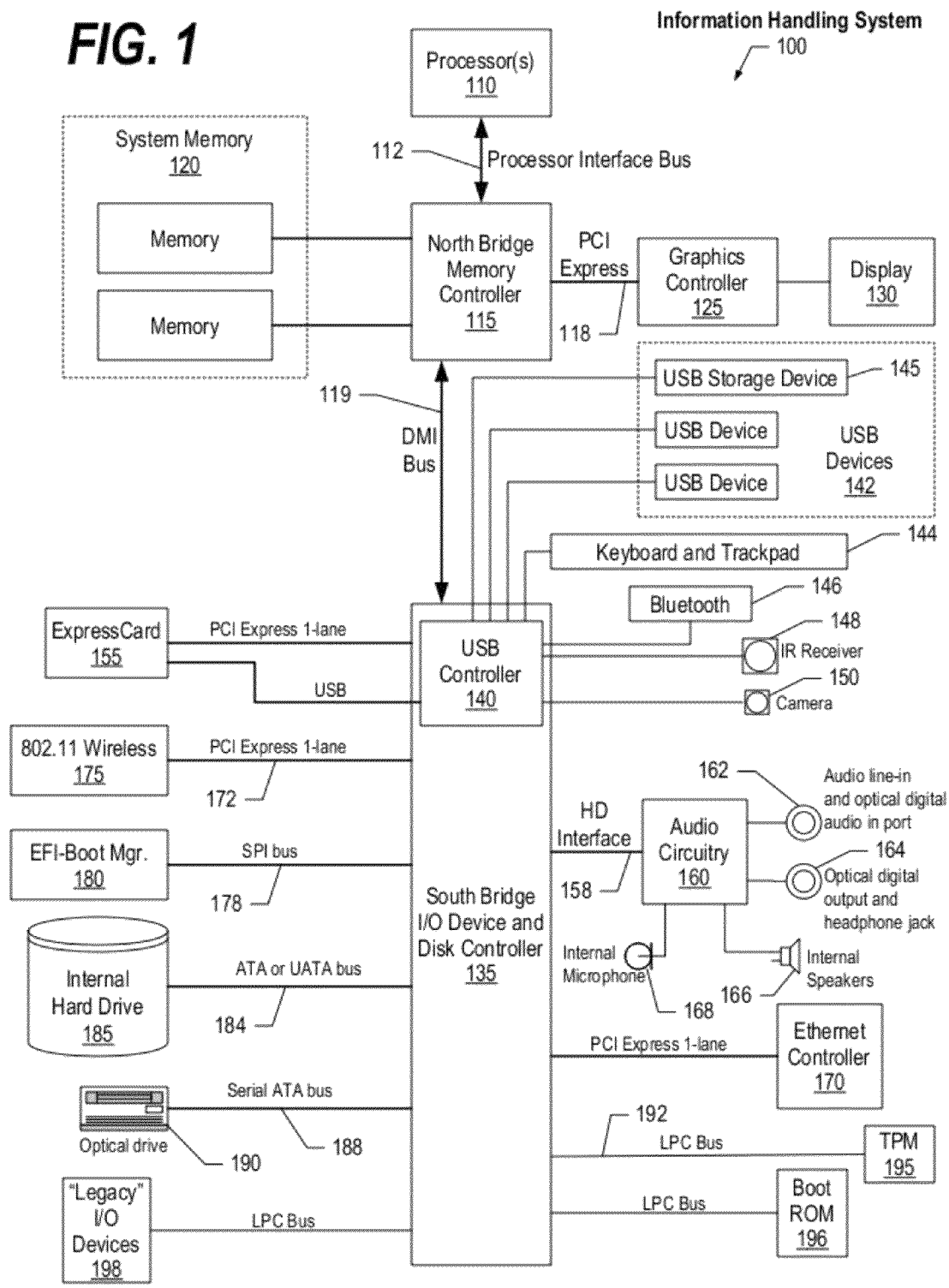
FIG. 1 is a block diagram of a data processing system in which the methods described herein can be implemented.
Figure 2:
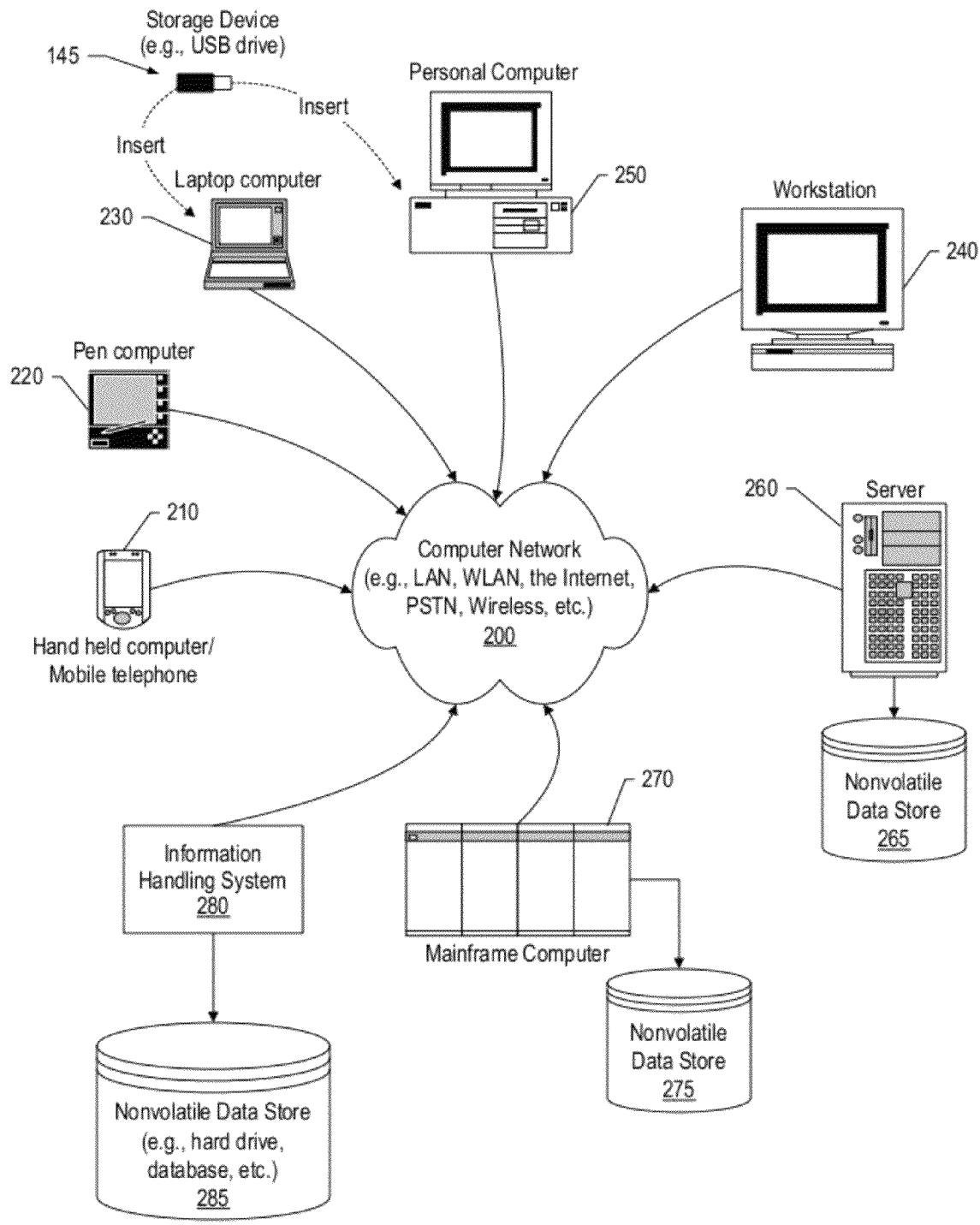
FIG. 2 provides an extension of the information handling system environment shown in FIG. 1 to illustrate that the methods described herein can be performed on a wide variety of information handling systems which operate in a networked environment.

FIG. 1 illustrates information handling system 100, which is a simplified example of a computer system capable of performing the computing operations described herein. Information handling system 100 includes one or more processors 110 coupled to processor interface bus 112. Processor interface bus 112 connects processors 110 to Northbridge 115, which is also known as the Memory Controller Hub (MCH). Northbridge 115 connects to system memory 120 and provides a means for processor(s) 110 to access the system memory. Graphics controller 125 also connects to Northbridge 115. In one embodiment, PCI Express bus 118 connects Northbridge 115 to graphics controller 125. Graphics controller 125 connects to display device 130, such as a computer monitor.

Northbridge 115 and Southbridge 135 connect to each other using bus 119. In one embodiment, the bus is a Direct Media Interface (DMI) bus that transfers data at high speeds in each direction between Northbridge 115 and Southbridge 135. In another embodiment, a Peripheral Component Interconnect (PCI) bus connects the Northbridge and the Southbridge. Southbridge 135, also known as the I/O Controller Hub (ICH) is a chip that generally implements capabilities that operate at slower speeds than the capabilities provided by the Northbridge. Southbridge 135 typically provides various busses used to connect various components. These busses include, for example, PCI and PCI Express busses, an ISA bus, a System Management Bus (SMBus or SMB), and/or a Low Pin Count (LPC) bus. The LPC bus often connects low-bandwidth devices, such as boot ROM 196 and "legacy" I/O devices (using a "super I/O" chip). The "legacy" I/O devices (198) can include, for example, serial and parallel ports, keyboard, mouse, and/or a floppy disk controller. The LPC bus also connects Southbridge 135 to Trusted Platform Module (TPM) 195. Other components often included in Southbridge 135 include a Direct Memory Access (DMA) controller, a Programmable Interrupt Controller (PIC), and a storage device controller, which connects Southbridge 135 to nonvolatile storage device 185, such as a hard disk drive, using bus 184.

ExpressCard 155 is a slot that connects hot-pluggable devices to the information handling system. ExpressCard 155 supports both PCI Express and USB connectivity as it connects to Southbridge 135 using both the Universal Serial Bus (USB) the PCI Express bus. Southbridge 135 includes USB Controller 140 that provides USB connectivity to devices that connect to the USB. These devices include webcam (camera) 150, infrared (IR) receiver 148, keyboard and trackpad 144, and Bluetooth device 146, which provides for wireless personal area networks (PANs). USB Controller 140 also provides USB connectivity to other miscellaneous USB connected devices 142, such as a mouse, removable nonvolatile storage device 145, modems, network cards, ISDN connectors, fax, printers, USB hubs, and many other types of USB connected devices. While removable nonvolatile storage device 145 is shown as a USB-connected device, removable nonvolatile storage device 145 could be connected using a different interface, such as a Firewire interface, etcetera.

Wireless Local Area Network (LAN) device 175 connects to Southbridge 135 via the PCI or PCI Express bus 172. LAN device 175 typically implements one of the IEEE .802.11 standards of over-the-air modulation techniques that all use the same protocol to wireless communicate between information handling system 100 and another computer system or device. Optical storage device 190 connects to Southbridge 135 using Serial ATA (SATA) bus 188. Serial ATA adapters and devices communicate over a high-speed serial link. The Serial ATA bus also connects Southbridge 135 to other forms of storage devices, such as hard disk drives. Audio circuitry 160, such as a sound card, connects to Southbridge 135 via bus 158. Audio circuitry 160 also provides functionality such as audio line-in and optical digital audio in port 162, optical digital output and headphone jack 164, internal speakers 166, and internal microphone 168. Ethernet controller 170 connects to Southbridge 135 using a bus, such as the PCI or PCI Express bus. Ethernet controller 170 connects information handling system 100 to a computer network, such as a Local Area Network (LAN), the Internet, and other public and private computer networks.

While FIG. 1 shows one information handling system, an information handling system may take many forms. For example, an information handling system may take the form of a desktop, server, portable, laptop, notebook, or other form factor computer or data processing system. In addition, an information handling system may take other form factors such as a personal digital assistant (PDA), a gaming device, ATM machine, a portable telephone device, a communication device or other devices that include a processor and memory.

The Trusted Platform Module (TPM 195) shown in FIG. 1 and described herein to provide security functions is but one example of a hardware security module (HSM). The TPM is a hardware security subsystem that may be incorporated into any number of information handling systems, such as those outlined in FIG. 2.

FIG. 2 provides an extension of the information handling system environment shown in FIG. 1 to illustrate that the methods described herein can be performed on a wide variety of information handling systems that operate in a networked environment. Types of information handling systems range from small handheld devices, such as handheld computer/mobile telephone 210 to large mainframe systems, such as mainframe computer 270. Examples of handheld computer 210 include personal digital assistants (PDAs), personal entertainment devices, such as MP3 players, portable televisions, and compact disc players. Other examples of information handling systems include pen, or tablet, computer 220, laptop, or notebook, computer 230, workstation 240, personal computer system 250, and server 260. Other types of information handling systems that are not individually shown in FIG. 2 are represented by information handling system 280. As shown, the various information handling systems can be networked together using computer network 200. Types of computer network that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. Some of the information handling systems shown in FIG. 2 depicts separate nonvolatile data stores (server 260 utilizes nonvolatile data store 265, mainframe computer 270 utilizes nonvolatile data store 275, and information handling system 280 utilizes nonvolatile data store 285). The nonvolatile data store can be a component that is external to the various information handling systems or can be internal to one of the information handling systems. In addition, removable nonvolatile storage device 145 can be shared among two or more information handling systems using various techniques, such as connecting the removable nonvolatile storage device 145 to a USB port or other connector of the information handling systems.

Figure 3:
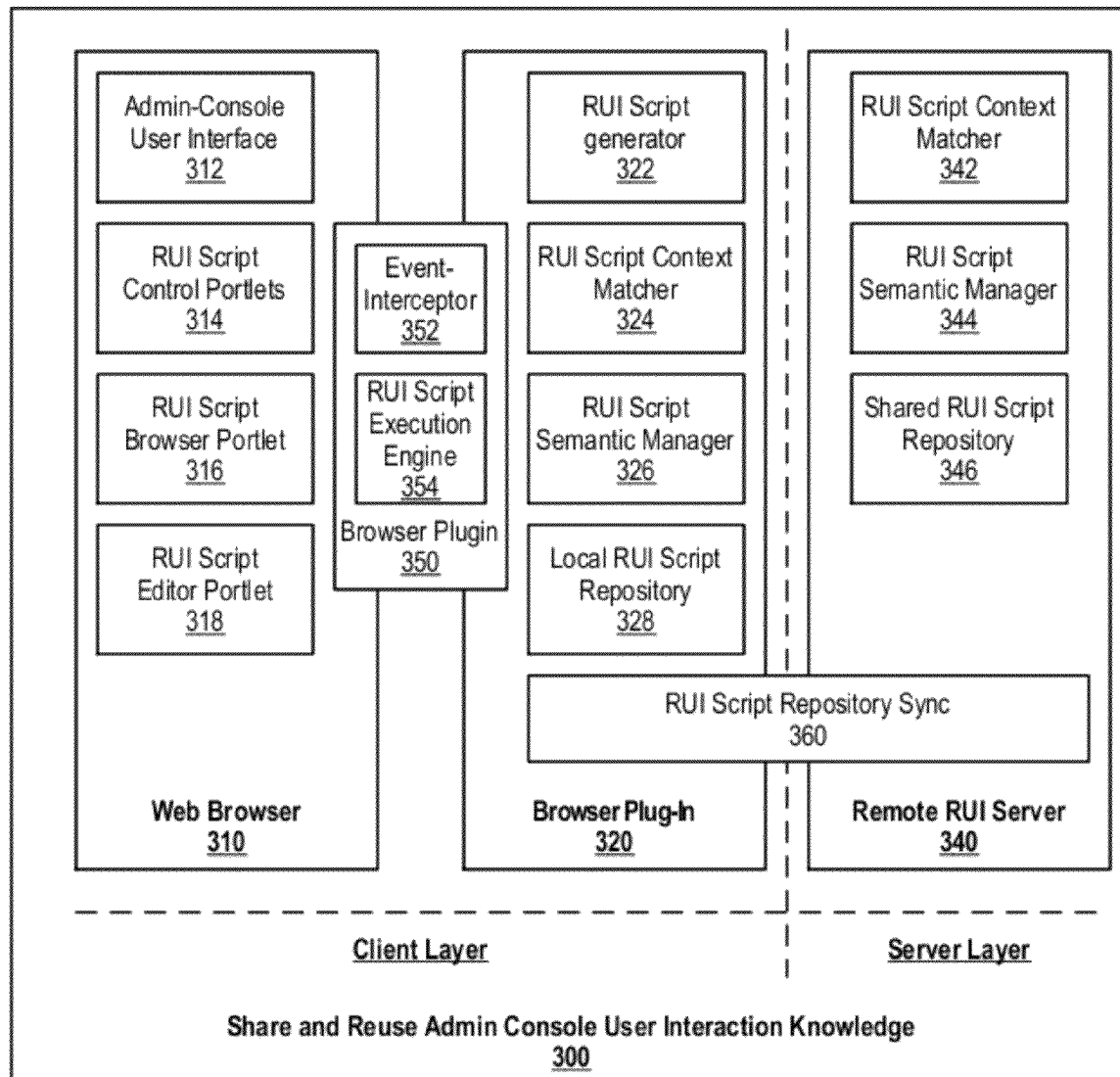
FIG. 3 is a high-level diagram showing components used to seamlessly share and reuse administration console user knowledge using Reusable User Interaction (RUI) scripts.

FIG. 3 is a high-level diagram showing components used to seamlessly share and reuse administration console usage knowledge using Reusable User Interaction (RUI) scripts. The web-based administration console (admin-console) is able to contextually and seamlessly tap into the collective intelligence of the community, while contributing to it as well. In addition, this capability is provided in the base-component (such as Integrated Solution Console), so that product specific extension (admin-console extensions) can use this feature as-is.

System 300 provides components to share and reuse administrator console user interaction knowledge. Major components of system 300 include web browser 310, browser plug-in 320, and remote RUI server 340. Browser plug-in 350 provides an interface between web browser 310 and browser plug-in 320 while RUI script repository sync 360 provides a synchronization process of RUI scripts between local script repository and remote RUI server 340.

Web browser 310 includes administrator console user interface 312, RUI script control portlets 314, RUI script browser portlet 316, and RUI script editor portlet 318.

Browser plug-in 320 (e.g., IBM Corporation's Lotus Expeditor™, etc.) provides for the construction, integration, and deployment of "managed client applications", which are client applications that are deployed from, configured, and managed onto a computer system, usually by a remote server. The goal of browser plug-in 320 is to allow developers to create applications that take advantage of running on a local client, while having the same ease of maintenance as web-based applications. RUI components included in browser plug-in 320 include RUI script generator 322, RUI script context matcher 324, RUI script semantic manager 326, and local RUI script repository interface 328.

Remote RUI server 340 includes components of RUI script context matcher 342, RUI script semantic matcher 344, and shared RUI script repository 346. The Remote RUI server component is included in the Server Layer, while Web Browser 310 and browser plug-in 320 are included in the Client Layer.

Browser plug-in 350 includes event interceptor component 352 and RUI script execution engine component 354.

The above-referenced components provide the ability to capture and share the sequence of administration actions (or recipe) performed by the user using the web-based admin-console as a knowledge-asset in a contextual manner, for off-line collaboration with peers in the community. These components also provide the ability to browse and search for a admin-console-interaction knowledge-asset based on the current context of the admin-console, and apply the same. The components further provide the ability to transfer the context and state from one admin-console instance to another admin-console dynamically, in order to enable effective on-line collaboration and knowledge-exchange.

The solution can be further extended to various embodiments. These embodiments include the ability to adapt to minor changes in the user-interaction implementation across multiple releases, such as minor UI changes between versions of the admin-console. Another embodiment is the ability to enrich the admin-console-interaction knowledge-asset with semantic-tags, scores, comments, discussions, etc. A further embodiment is to take a snap-shot of the state of admin-console contextually and save it as a bookmark for future reference.

The web-based administration console provides various facets and features. These features include recording the user-interactions (user-inputs and user-actions) in the form of client-executable scripts (also referred to as Reusable User Interaction scripts or RUI Scripts) See, e.g., component 322. Another feature is an editor to edit the recorded RUI Scripts (component 318). Another feature is a publishing technology to publish the RUI Scripts to a reuse-repository in a semantically comprehensible manner for another user (RUI Script Repository Sync 360, local script repository 328, and remote script repository 346). Another feature is a lookup feature to lookup and reuse the RUI Scripts (script context matcher 324, script semantic manager 326, and script execution engine 354).

The end-user is provided with additional portlets to: (a) manually record the user-interaction (inputs and action), using a [start], [pause], [resume], [stop] primitives in the RUI Control Portlet 314; (b) maintain a local repository of reusable user-interaction (Local RUI Script Repository 328); (c) view the pre-recorded user-interaction (using RUI Script Browser Portlet 316); (d) edit the recorded-scripts and corresponding input-data (using RUI Script Editor Portlet 318); (e) annotate them with tags and description (using RUI Script Semantic Manager 326); (f) search for pre-recorded user-interaction (using RUI Script Context Matcher 324); (g) connect to a remote user-interaction reuse repository (Shared RUI Script Repository 346); (h) publish the user-interaction to the remote reuse-repository (using RUI Script Repository Sync 360); (i) download reusable user-interaction from the remote repository to the local repository (using RUI Script Repository Sync 360); (j) recommend reusable user-interaction, based on the current user-interaction context (using RUI Script Context Matcher 324); (k) run the recorded-scripts (using RUI Script Execution Engine 354).

The admin-console application developer is provided with additional client-side APIs to: (a) prepare reusable script that encapsulate the user-actions and user-inputs (RUI Script generator 322); (b) store the reusable user-interactions in a repository (Local RUI Script Repository 328); and (c) play (or run) the pre-recorded scripts (RUI Script Execution Engine 354).

Client-side capabilities include the use of plugins to a web-browser. The Enhancements in the client-components and other components are used to facilitate sharing and reuse of administrator console user interaction knowledge. In order to perform these operations in a contextual manner, a 'context' of an admin-console application includes the following: (a) Admin-console application URL; (b) ISC Navigation context; (c) Portlet context; and (d) Form context (if any).

A combination of the above is used to define the context of the RUI Script—referred to herein as RUI ScriptContext. The RUI ScriptContext is constructed by introspecting the Document Object Model (DOM) tree (DOMTree) of the web-page currently loaded by the browser. This RUI ScriptContext is stored along with the RUI Script in the repository. The 'RUI Script Control Portlet' 314 'RUI Script Browser Portlet' 316, and 'RUI Script Editor Portlet' 318 are included in every screen/page of the admin-console by ISC.

RUI Script Context Matcher component 324 use the RUI ScriptContext information to partially match the current context of the user-interaction, in order to search the repository and make a recommendation.

Event Interceptor component 352 of browser plugin 350 extracts the current context. Similarly, Event Interceptor component 352 is also used to intercept the DOM Events and extract the relevant user-actions/user-inputs (user-interaction) for recording.

The RUI Script Generator 322 collects the user-interaction information from Event Interceptor 352 to generate RUI Script (e.g., in a language such as JavaScript) and the RUI Script is stored in RUI Script Repository 328. RUI Script Execution Engine 354 of browser plugin 350 is used to execute the RUI Script (e.g., pre-recorded JavaScript).

Figure 4:
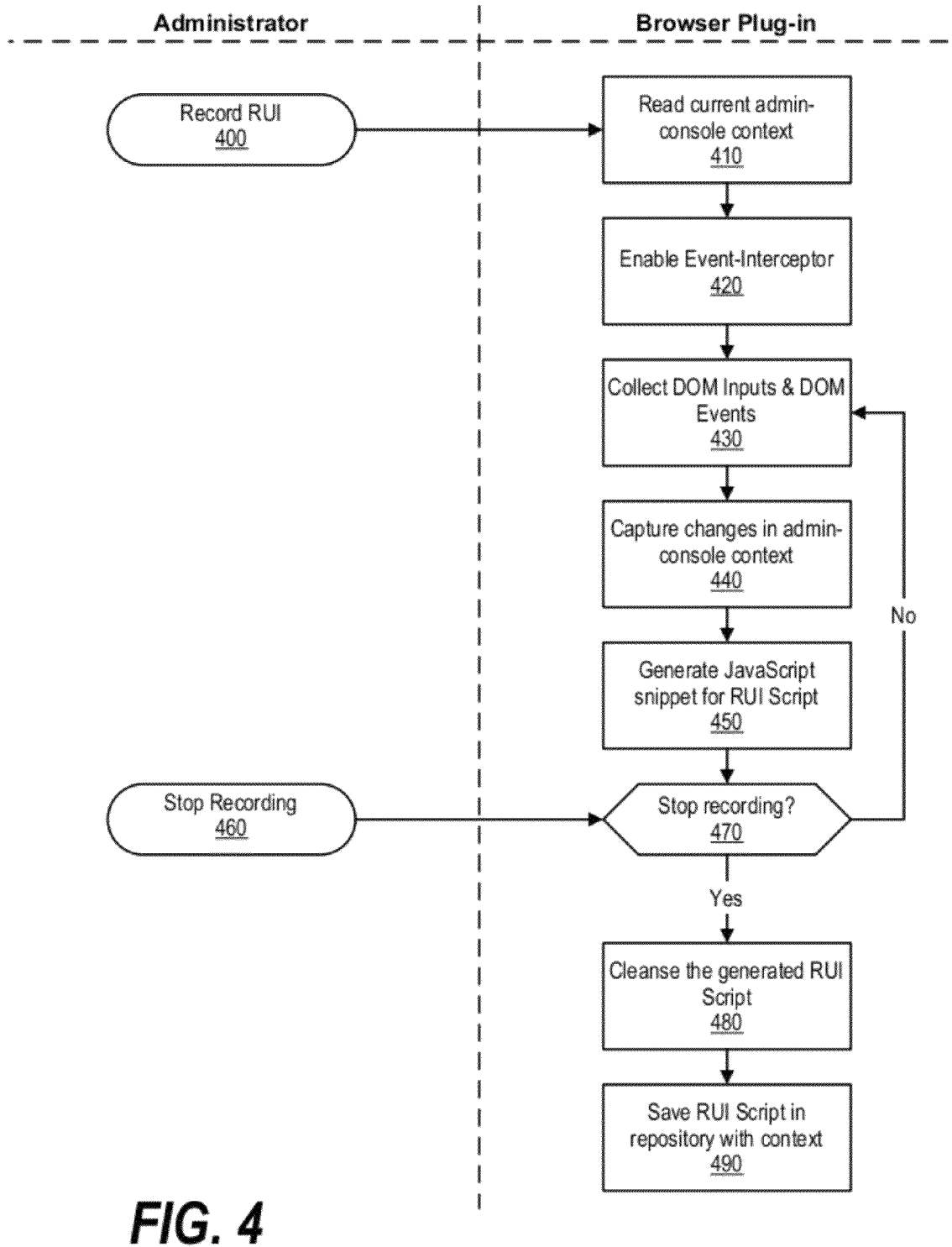
FIG. 4 is a flowchart showing steps taken to record Reusable User Interaction (RUI) scripts.

FIG. 4 is a flowchart showing steps taken to record Reusable User Interaction (RUI) scripts. The method to contextually record a reusable user-interaction (RUI) is illustrated in the flow-chart. The Administrator initiates the recording of RUI at 400. At step 410, the browser-plugin reads the current ISC context by exploring the DOM Tree of the admin-console for URLs, Navigation context, and Portlet context. See FIG. 6 and corresponding text for processing details regarding step 410.

At step 420, the Event Interceptor is enabled. Subsequently, at step 430, the Event Interceptor collects the user-interaction between the administrator and DOM (in the form of DOM inputs and DOM events). See FIG. 7 and corresponding text for processing details regarding step 430. The admin-console application context is monitored continuously for changes. If there is a change in the admin-console application context, then the intermediate admin-console application context is tagged along with the generated RUI Script. At step 440, changes in the administrator console context are captured.

At step 450, the relevant user-interactions are translated and recorded as JavaScript snippets. See FIG. 9 and corresponding text for processing details regarding generating the RUI Script.

The above-described processing used to capture inputs, events, and context changes and generate RUI script continues until the Administrator stops recording (or a timed event occurs). A decision is made as to whether the recording has been stopped (decision 470). If the recording has not been stopped, then decision 470 branches to the "no" branch which loops back to continue collecting inputs, events, and changes in the console context and generate JavaScript snippets. This processing continues until a stop recording signal 460 is received (e.g., the administrator manually stopping the recording, a timed event, etc.), at which point decision 470 branches to the "yes" branch whereupon, at step 480, the generated RUI script is cleansed at step 480 and, at step 490, RUI Script is saved in the target repository (default is the local repository) along with the admin-console application context automata, captured while recording. At this point, the Administrator can view the RUI Script, edit it if necessary, and publish the same to the remote repository.

Manage the Changes in the Context-Definition of Admin-Console

The user-interaction context of the admin-console application continuously changes at runtime based on the administration task. The user-interaction context-definition of the admin-console application is stored in a manner that allows the following:
  rapidly match context (to quickly determine the applicable RUI Script for reuse)
  perform partial/imperfect match of context (to support search for similar RUI Script)
  migrate the context from version X of the admin-console application to version X+1 of the same admin-console application.

The context-definition of an admin-console is a document comprising of the following state-attributes:
  Admin-console application (root-element)
    title of the application (displayed in the browser)
    user-id/role
  Navigation Portlet (child-element of admin-console application)
    Active navigation-item
  Admin-console tabbed-page
    Active page (title of the page)
  Admin-console portlets
    Name/title of the portlet
    List of forms
      List of form-fields (names), in each form This context-hierarchy is represented as an XML document. The context-manager will store these document as a radix-tree (or patricia-trie), in order to be able 1. to rapidly navigate and search for context
2. to perform partial/inaccurate context match A change in the context definition of the admin-console is due a change in any of the following:

| Element (in a context-definition) | Change |
| --- | --- |
| Admin-console-application-root-element | Change in value of title, user-id, role. |
| navigation-element | Change in selection in the Navigation portlet |
| admin-console-tabbed-page | Change in selection of the tabbed page |
| admin-console portlet-elements | Changes in list of visible portlets |
| | Change in the value of portlet-title |
| forms-elements | Changes in the list of visible form-fields |

The context-definition is captured at the beginning of a recording (of the RUI Script) and updated every time the context-definition changes. The aggregation of these changes in the context-definition can be visual represented as context-automata. It is used as the index to save and store the recorded RUI Script.

Figure 5:
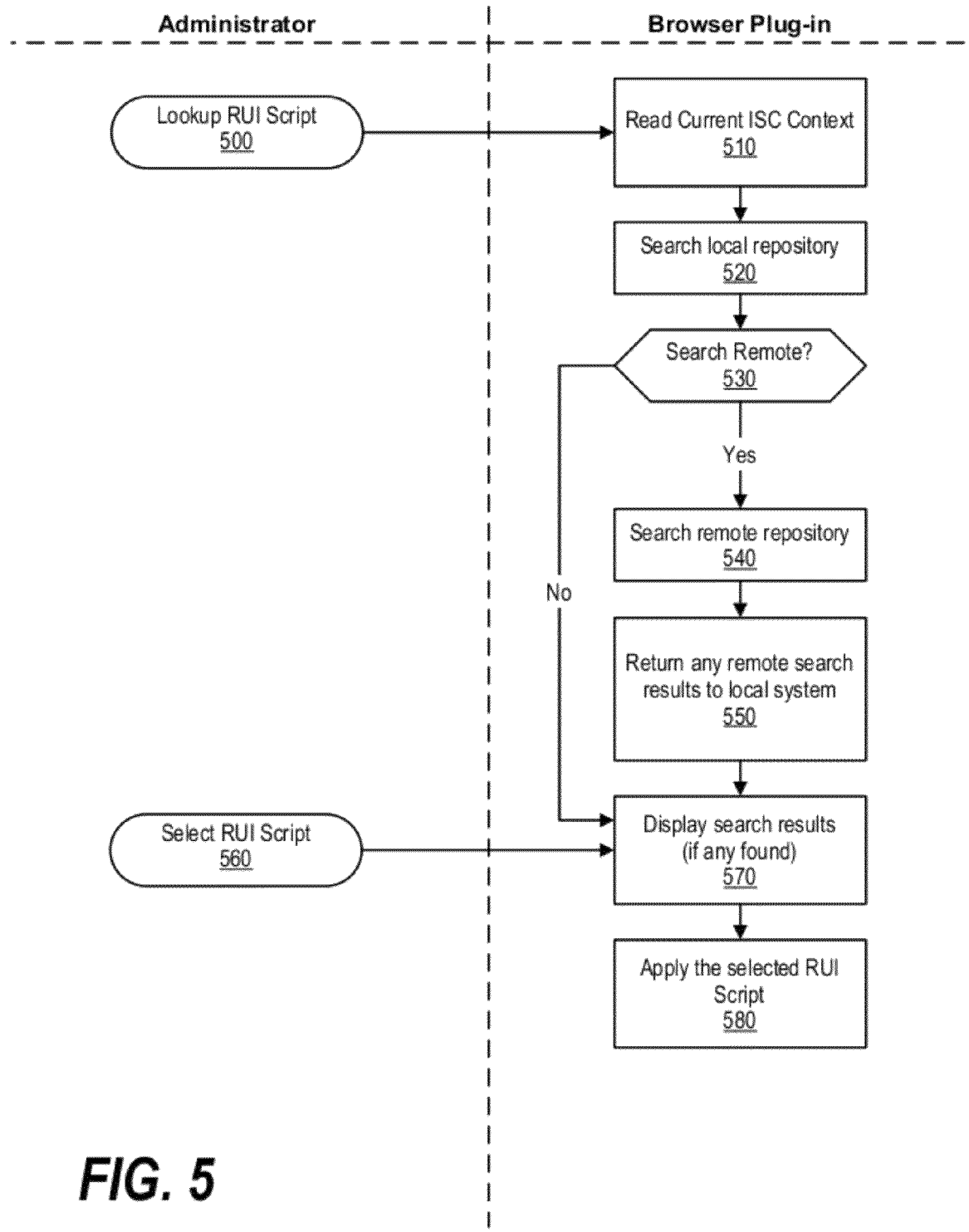
FIG. 5 is a flowchart showing steps used to locate Reusable User Interaction (RUI) scripts.

FIG. 5 is a flowchart showing steps used to locate and use Reusable User Interaction (RUI) scripts. At 500 the Administrator initiates the process to look-up for expertise in the RUI Repository (default is local repository).

At step 510, the browser-plugin reads the current ISC context by exploring the DOM Tree for the admin-console URLs, Navigation context, and Portlet context. At step 520, the Context Matcher searches the local RUI Script Repository for context matches. Since the RUI Scripts in the repository are indexed-by the 'starting admin-console application context' and the 'intermediate context' (represented using a context-automata), the Context Matcher will be able to recommend RUI Scripts based on the current context of the admin-console application. The Context Matcher will perform a partial-relative-match of URLs, Navigation Context and Portlet Context; as explained in FIG. 12 and corresponding text.

The Administrator can also initiate the search for RUI Script in the remote RUI Script Repository. A decision is made as to whether remote searching is being performed (decision 530). If remote searching is requested, then decision 530 branches to the "yes" branch whereupon, at step 540, a search is made of the remote repository similar to the search made of the local repository as described in step 520. If one or more remote RUI scripts are found, then, at step 550, these remote RUI scripts are returned to the local computer system so that they can be displayed to the administrator for consideration.

The result-set is sorted by relevance and presented to the Administrator, if any are found, at step 570. The Administrator browses and selects an RUI Script for execution from the list provided. The Administrator provides selection 560 of one of the displayed search results and, at step 580, the selected RUI script is applied (e.g., executed). The browser-plugin executes the RUI Script in either single step mode (used to execute each step in the script), or in execute mode (used to quickly run the RUI Script till the end).

Figure 6:
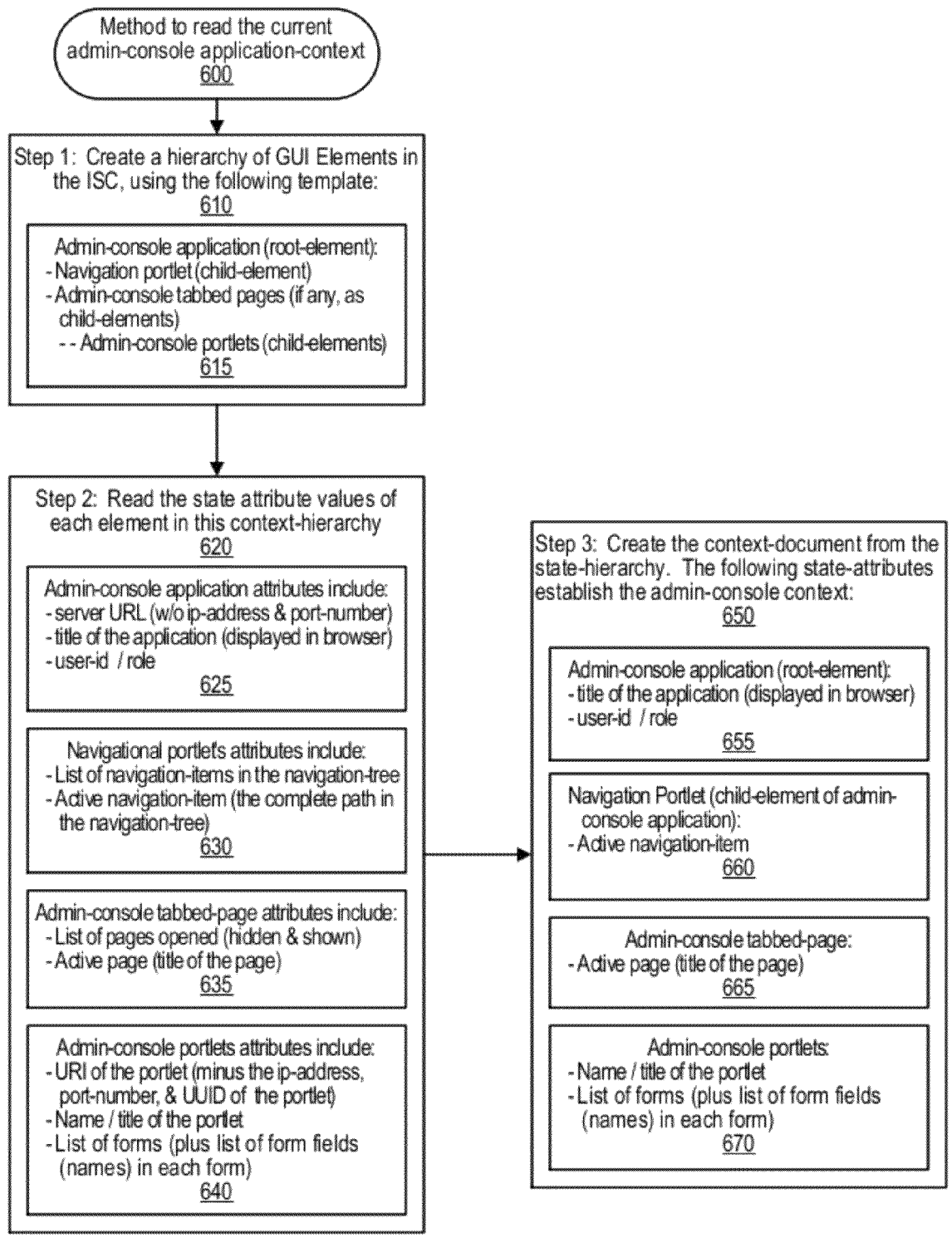
FIG. 6 is a flowchart showing steps taken to read the current administrator console application context.

FIG. 6 is a flowchart showing steps taken to read the current administrator console application context. The user-interaction context of the Integrated Solution Console (ISC) is defined by the current state of the admin-console application. The state of admin-console application is an aggregation of the individual state of the portlets currently being displayed in ISC. The 'RUI Script Control Portlet' of ISC is automatically included in every screen/page of the admin-console. Hence, 'RUI Script Control Portlet' can access the DOM Elements (including the GUI components) used by the admin-console application. The 'RUI Script Control Portlet' explores the DOM Tree (e.g., using JavaScript), to extract the information outlined in the following three major steps in order to establish the state/context of the ISC.

Processing commences at 600 and includes three primary steps, each of which have a number of steps. The first step (step 610) is used to create a hierarchy of GUI elements in the ISC. This step uses template 615 which includes:
    Admin-console application (root-element)
        Navigation portlet (child-element)
            Admin-console tabbed pages (if any, as child-elements)
                Admin-console portlets (child-elements)

The second step (step 620) is performed in order to read the state attribute values of each element in the context hierarchy which was found in the first step using the following context hierarchy:
    Admin-console application attributes (625) include:
        server URL (minus the ip-address and port-number)
        title of the application (displayed in the browser)
        user-id/role
    Navigational portlet's attributes (630) include:
        List of navigation-items in the navigation-tree
        Active navigation-item (the complete path in the navigation-tree)
    Admin-console tabbed-page attributes (635) include:
        List of pages opened (hidden and shown)
        Active page (title of the page)
    Admin-console portlets attributes (640) include:
        URI of the portlet (minus the ip-address, port-number, and UUID of the portlet)
        Name/title of the portlet
        List of forms
            List of form-fields (such as text-field, checkbox, etc.) in each form
                {Name, state-value} of each form-field.

Finally, the third step (step 650) is performed in order to create a context document from the state hierarchy resulting from the second step. The following state-attributes establish the admin-console context:
    Admin-console application (root-element) (655) include:
        title of the application (displayed in the browser)
        user-id/role
    Navigation Portlet (child-element of admin-console application) (660) include:
        Active navigation-item
    Admin-console tabbed-page (665) include:
        Active page (title of the page)
    Admin-console portlets (670) include:
        Name/title of the portlet
        List of forms
            List of form-fields (names), in each form.

Figure 7:
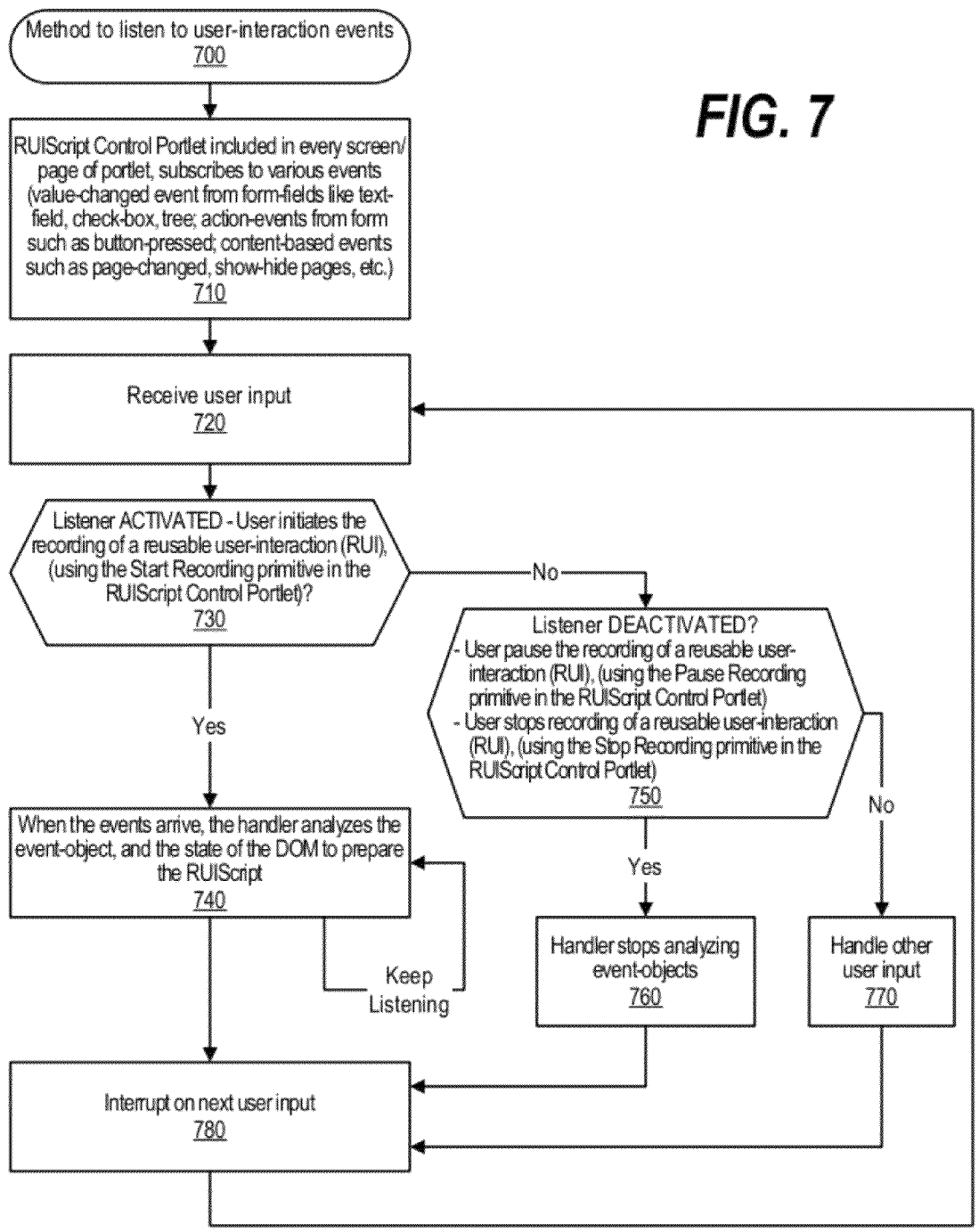
FIG. 7 is a flowchart showing steps taken to listen to user-interaction events.

This context-hierarchy is represented as an XML document. The context-manager will store these document as a radix-tree (or patricia-trie), in order to be able to rapidly navigate and search for context and to perform partial/inaccurate context match. The 'prepare context-document action' is activated when the following is triggered:
    User initiates the recording of a reusable user-interaction (RUI), (using the Start Recording primitive in the RUI Script Control Portlet); or
    User/system triggers a look-up/search for RUI Scripts FIG. 7 is a flowchart showing steps taken to listen to user-interaction events. Processing commences at 700 whereupon, at step 710, RUI Script Control Portlet included in every screen/page of portlet, subscribes to various events (value-changed event from form-fields like text-field, check-box, tree; action-events from form such as button-pressed; content-based events such as page-changed, show-hide pages, etc.). At step 720, user input is received. A decision is made as to whether the user input ACTIVATES the listener (decision 730). In one embodiment, the user initiates the recording of a reusable user-interaction (RUI), (such as by using the Start Recording primitive in the RUI Script Control Portlet). If the user activates the recording of a RUI Script, then decision 730 branches to the "yes" branch whereupon, at step 740 the listener process operates so that when the events arrive, the handler analyzes the event-object, and the state of the DOM to prepare the RUI Script. This process continues listening for events until it is deactivated.

Returning to decision 730, if the user input is not to activate the listener, then decision 730 branches to the "no" branch whereupon a decision is made as to whether the user input is to DEACTIVATE the listener (decision 750). One way that the user deactivates the listener is by pausing the recording of a reusable user-interaction (RUI), (using the Pause Recording primitive in the RUI Script Control Portlet). Another way that the user deactivates the listener is by stoping recording of a reusable user-interaction (RUI), (using the Stop Recording primitive in the RUI Script Control Portlet). If the user has deactivated the recording of an RUI script, then decision 750 branches to the "yes" branch whereupon, at step 760, the listener (handler) stops analyzing event objects until the listener is re-activated. On the other hand, if the user input is not to activate or deactivate the listener, then decision 750 branches to the "no" branch whereupon, at step 770, some other user request is handled. At step 780, the process waits for the next user input (either while the listener is activated and events are being captured, or while the listener is deactivated). Processing then loops back to step 720 to process the user input.

Figure 8:
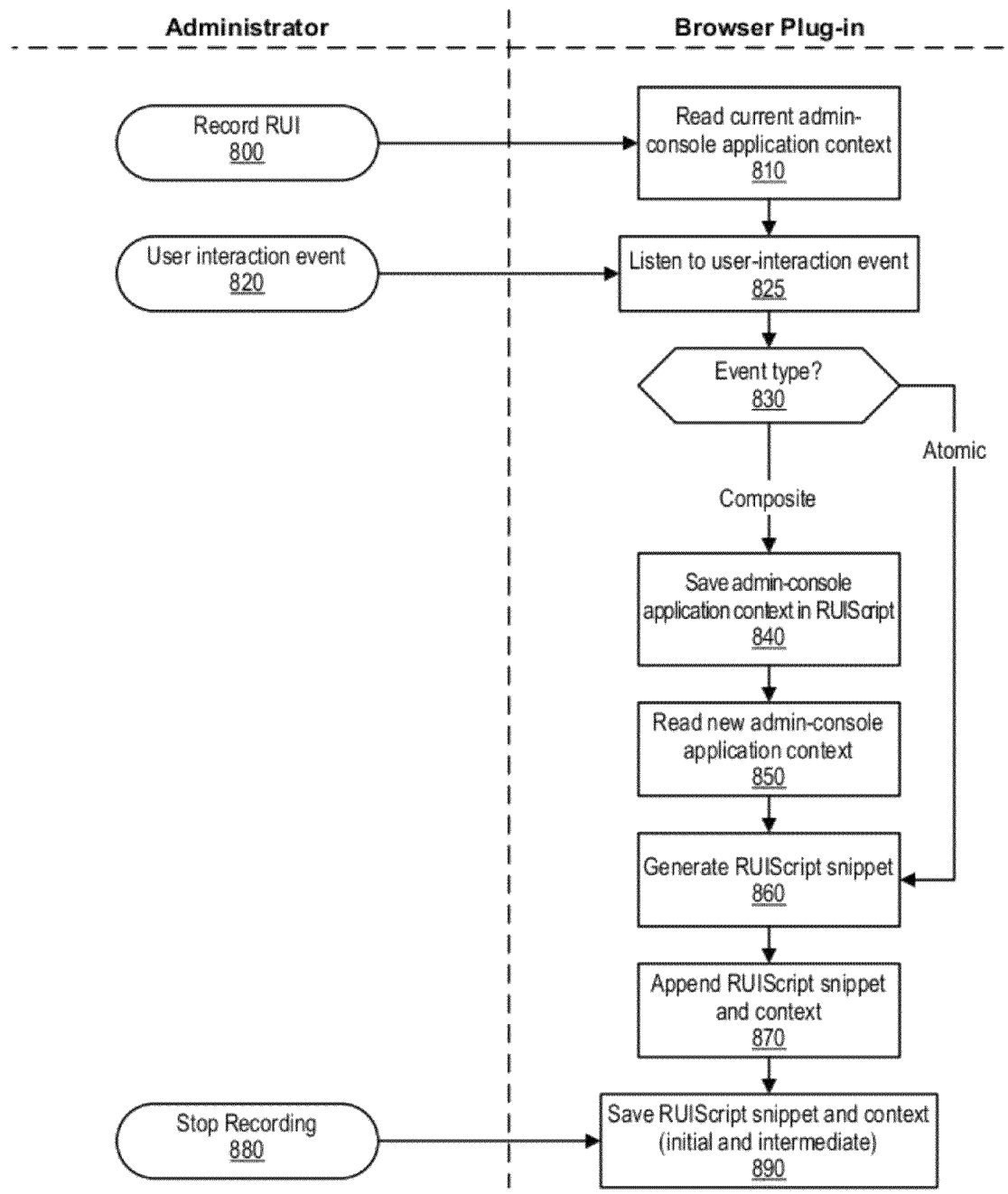
FIG. 8 is a flowchart showing steps taken to incrementally generate Reusable User Interaction (RUI) scripts.

FIG. 8 is a flowchart showing steps taken to incrementally generate Reusable User Interaction (RUI) scripts. The RUI Script is incrementally generated for every user-interaction event performed by the user in the admin-console. While generating RUI Script incrementally, the intermediate admin-console application-context is (re)captured every time a composite-interaction is performed by the user. Each user-interaction event appends a JavaScript snippet to the RUI Script.

The user-interaction can be broadly classified into two categories
    1) Atomic interaction—These are user-interactions, which involve events and/or actions performed by the user using form-fields (such as value-change events in text-box, combo, checkbox; selection-change events in list-box, tree, etc.). Typically, such interaction does not result in a change in the admin-console application-context.
    2) Composite interaction—These user-interactions composes of several atomic field-level interaction and finally an event/action which trigger a change in admin-console application-context. For example, when the user modifies the configuration values in the current admin-page and then clicks a submit-button, the admin-console application will move from the current page to another page (with different context). All user-interaction that causes a change in application-context is defined as a composite interaction.

Processing shown in FIG. 8 commences at 800 when a request is received to record a RUI script from the Administrator. At step 810, the browser plug-in reads the current administrator console application context as previously described in FIG. 6 and corresponding text. At step 825, the browser plug-in listens for user-interaction events to occur at the console (user interaction event 820). When an event occurs, a decision is made as to whether the event type is a composite event type or an atomic event type (decision 830). These event types were previously discussed at the beginning of the detailed description corresponding to FIG. 8.

If a composite event type is detected, then decision 830 branches to the "composite" branch for processing whereupon, at step 840, the administrator console application context is saved in the RUI Script and, at step 850, processing reads a new administrator console application context. On the other hand, if an atomic event type is detected, then decision 830 branches to the "atomic" branch bypassing steps 840 and 850.

At step 860, an RUI Script snippet is generated based on the detected event and, at step 870, this RUI Script snippet along with the console context is appended to the RUI Script. Steps 810 through 870 continue executing while additional events are detected. At some point, the administrator requests that RUI Script generation stop (stop recording 880). When the stop recording signal is received, the browser plug-in, at step 890, saves the RUI Script snippet and context (both the initial context and intermediate contexts).

Figure 9:
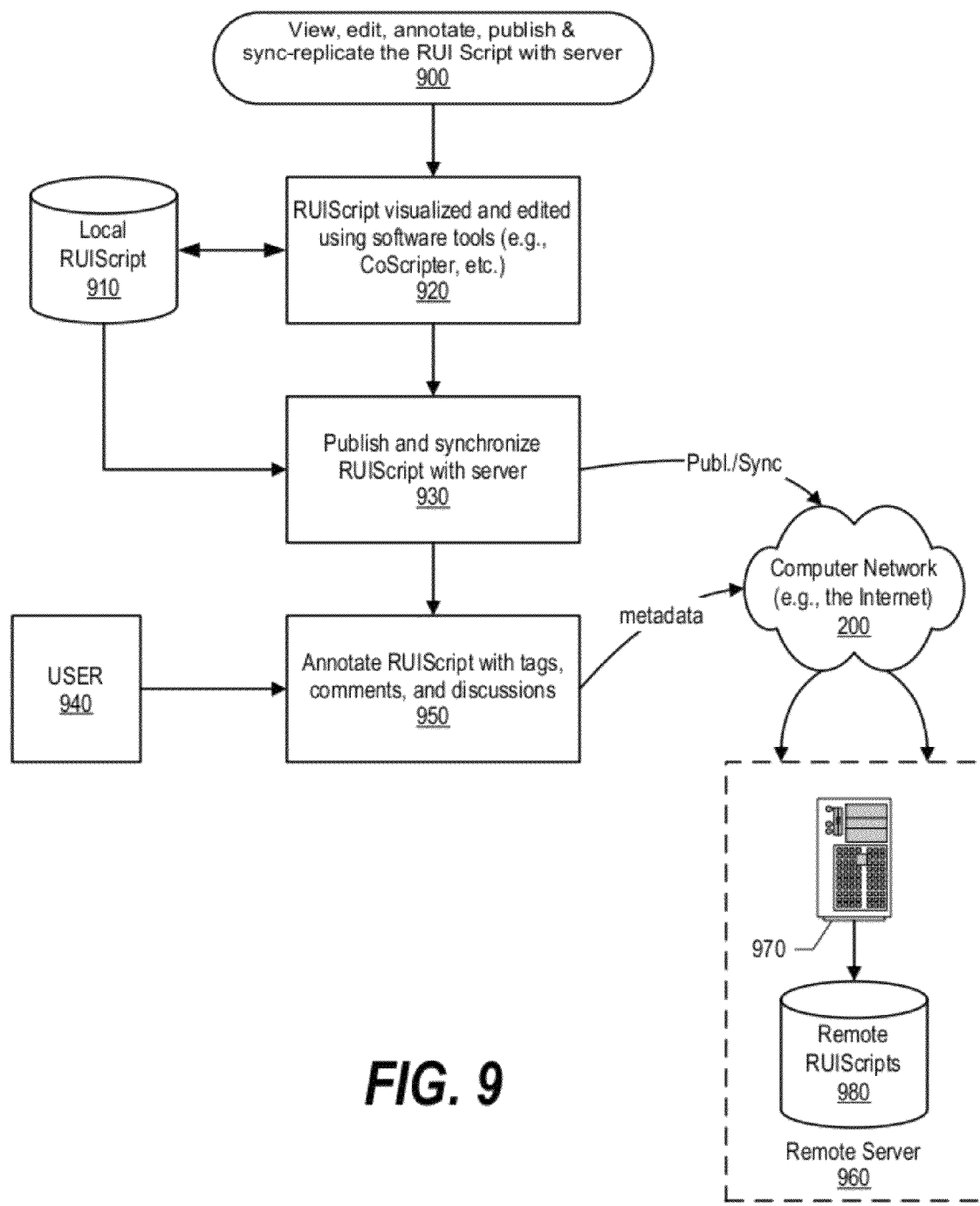
FIG. 9 is a flowchart showing steps taken to View, edit, annotate, publish, and sync-replicate the Reusable User Interaction (RUI) Script with a server.

FIG. 9 is a flowchart showing steps taken to View, edit, annotate, publish, and sync-replicate the Reusable User Interaction (RUI) Script with a server. The RUI Script are visualized and edited using the methods known and appreciated by those skilled in the art, such as those taught in the CoScripter tool. Additionally, the RUI Script can be published and sync-replicated with a server in the remote location using methods also known and appreciated to those skilled in the art. One method to view, edit annotate, publish and sync-replicate the RUI Script with server is shown in FIG. 9.

Processing commences at 900 whereupon, at step 920, RUI Script 910 is visualized and edited using known software tools (e.g., CoScripter, etc.). At step 930, the RUI Script is published and synchronized with remote server 960 that includes processing unit 970 and nonvolatile storage 980 used to store remote RUI Scripts. The RUI Scripts are transmitted to the remote server via computer network 200, such as the Internet.

Further, at step 950, the user (940) can annotate the RUI Script in the server with tags, comments and discussions. Thereby enabling seamless means to search and identify the multitudes of RUI Script in the server. These tags, comments and discussions (metadata) are also transmitted to remote server 960 via computer network 200.

Figure 10:
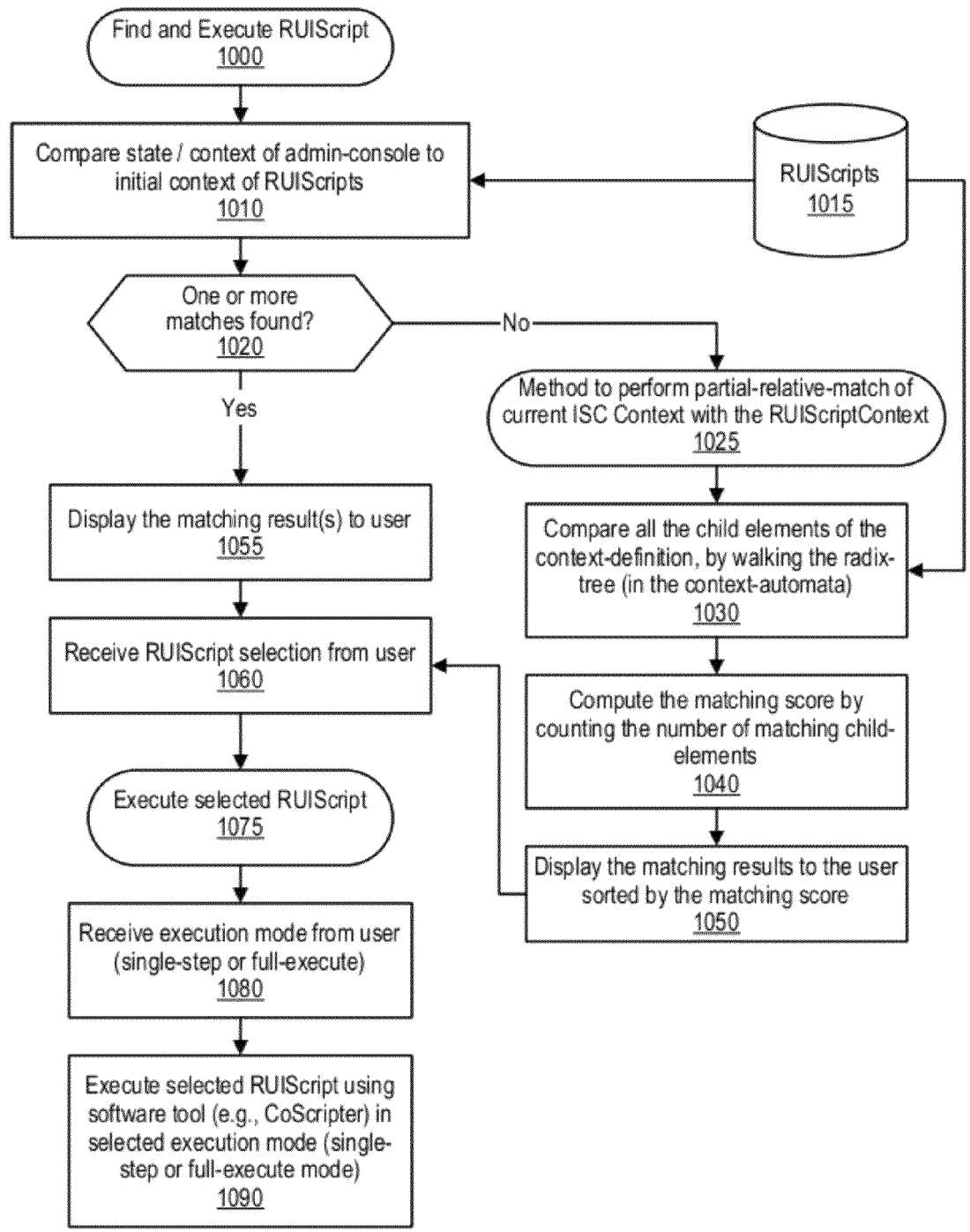
FIG. 10 is a flowchart showing steps taken to find and execute a Reusable User Interaction (RUI) Script.

FIG. 10 is a flowchart showing steps taken to find and execute a Reusable User Interaction (RUI) Script. While an Administrator is configuring (or working with) a system using the ISC-based admin-console, he/she may require expert advice (or reusable-knowledge) to complete the admin-task. In other words, when the Administrator decides to take help, he/she may already have performed a few operations/user-interactions. This results in the migration of the state of the admin-console application context, as explained below.

Processing commences at step 1000 whereupon, at step 1010, the current state/context of the admin-console is compared to the initial context of available RUI Scripts 1015. RUI Scripts 1015 can include both local RUI Scripts as well as remote RUI Scripts that are stored on one or more remote servers as previously shown in FIG. 9. Returning to FIG. 10, a decision is made as to whether one or more matches were found between the current state/context of the admin-console and one or more local and remote RUI Scripts (decision 1020).

If a match was not found, then decision 1020 branches to the "no" branch whereupon, at 1025, processing begins performing a partial-relative-match of the current ISC Context with the RUI Script Context included in RUI Scripts 1015 (both local and remote RUI Scripts can be used). The state/context of the admin-console application at the time of reuse may not always be the same as that of the initial context of an RUI Script. Since the intermediate context is recorded for the RUI Script, it is possible to perform contextual search. To perform a partial-relative-match, at step 1030, the process compares the child elements of the context-definition, by walking the radix-tree (in the context-automata). At step 1040, matching scores, that indicates how well the RUI Scripts matches the current ISC Context, are computed by counting the number of matching child-elements. At step 1050, the matching results (RUI Scripts) are displayed to the user sorted by the matching scores so that those RUI Scripts that more closely match the current ISC Context are displayed first.

Returning to decision 1020, if one or more RUI Scripts match the current ISC Context, then decision 1020 branches to the "yes" branch whereupon, at step 1055 the matching results are displayed to the user. At step 1060, an RUI Script selection is made by the user (either of an RUI Script based on matches of the initial context or an RUI Script based on partial-relative matches).

At 1075, processing commences execution of the RUI Script that was selected by the user. At step 1080, the process receives an execution mode from the user (e.g., single-step execution mode or full-execution mode). In single step mode, the user steps through each step of the script and can abort or alter the steps if needed. Conversely, in execute mode each step in the RUI Script is executed without prompting to the end of the script to allow for quick execution of the script. At step 1090, the selected RUI Script is executed using a software tool (e.g., the CoScripter software tool) in the execution mode (single-step or full-execute mode) selected by the user.

Figure 11:
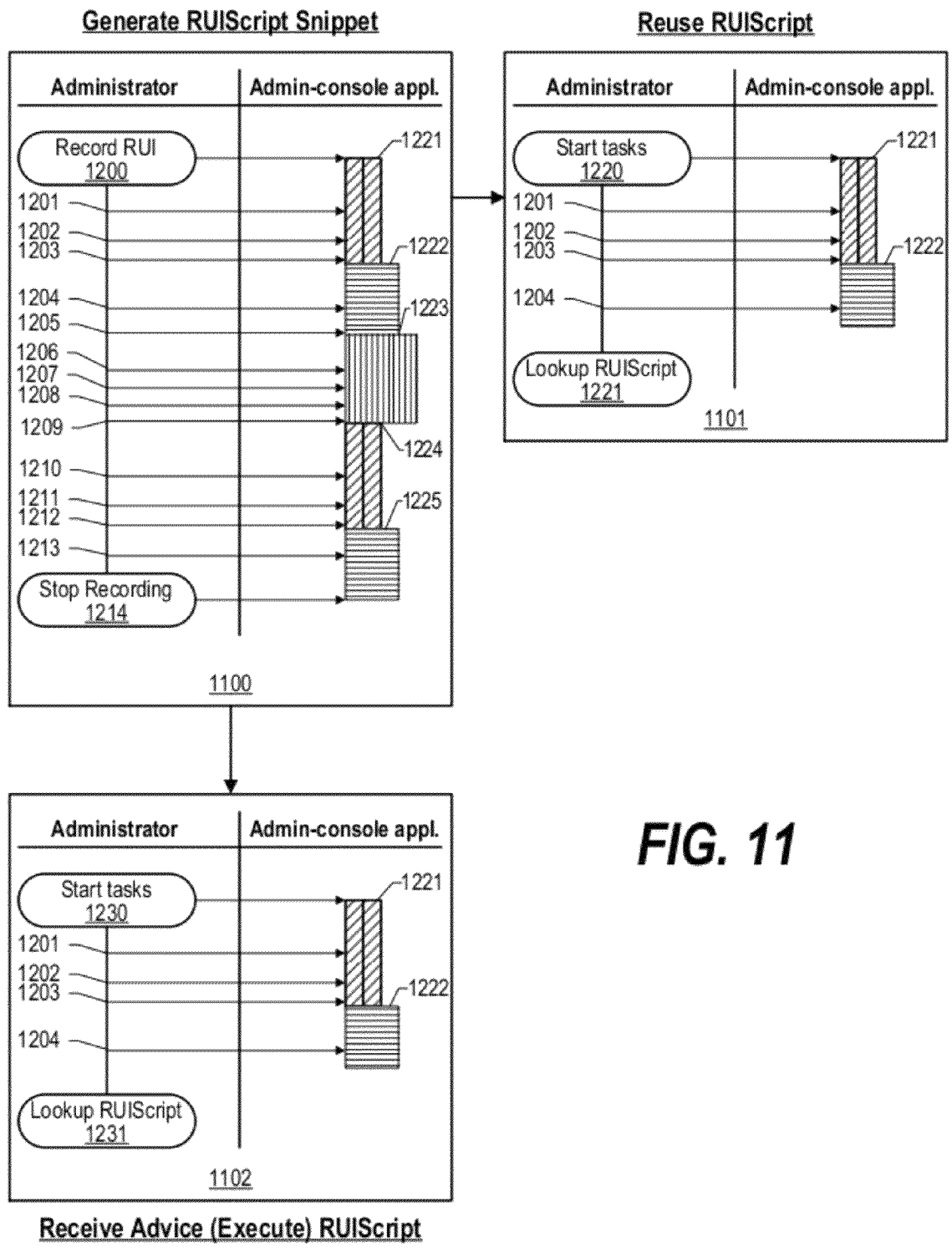
FIG. 11 is a diagram showing an example of the generation of a Reusable User Interaction (RUI) Script, the reuse of the RUI script, and the lookup of the RUI script given a particular context of the administrator console.

FIG. 11 is a diagram showing an example of the generation of a Reusable User Interaction (RUI) Script, the reuse of the RUI script, and the lookup of the RUI script given a particular context of the administrator console. As previously described, the RUI Script is incrementally generated for every user-interaction event performed by the user in the admin-console. Each user-interaction event will append a JavaScript snippet to the RUI Script.

The user-interaction can be broadly classified into two categories

1) Atomic interaction—These are user-interactions, which involve events/actions performed by the user using form-fields (such as value-change events in textbox, combo, checkbox; selection-change events in listbox, tree, etc.). Typically, such interaction does not result in a change in the admin-console application-context.

2) Composite interaction—These user-interactions composes of several atomic field-level interaction and finally an event/action which trigger a change in admin-console application-context. For example, when the user modifies the configuration values in the current admin-page and then clicks a submit-button, the admin-console application will move from the current page to another page (with different context). All user-interaction that causes a change in application-context is defined as a composite interaction.

The list of user-actions and its classification (atomic-interactions or composite-interactions) is maintained in an event-map. In addition, the changes in the ISC Context document is continuously monitored by the 'RUI Script Control Portlet', in order to detect the end of a composite-interaction, and the beginning of the next one. The 'changes' include major changes in the DOM-Tree, such as addition and removal of GUI elements.

In a simplified implementation, a RUI Script Snippet is generated (for every user-interaction event) and appended to the RUI Script. However, as the user-interaction continues, the process recognizes the shift in application-context of the admin-console, as illustrated in FIG. 11. In the Figure, diagram 1100 depicts the Administrator beginning the recording of RUI Script at 1200 when the admin-console application-context is at 1221. The RUI Script 1200 is an ordered sequence of messages 1201 through 1213. While the RUI Script is being recorded, it can be observed that the events 1203, 1205, 1209 and 1212 result in changes in the admin-console application-context from 1221 to 1222, to 1223, to 1224, and to 1225. The diagram depicts the Administrator stopping the recording at 1214. Therefore, the RUI Script 1200 is composed of the following 5 composite-interactions:

Context Interaction 1={context:1221, msg-seq(1200, 1201, 1202, 1203)}
Context Interaction 2={context:1222, msg-seq(1204, 1205)}
Context Interaction 3={context:1223, msg-seq(1206, 1207, 1208, 1209)}
Context Interaction 4={context:1224, msg-seq(1210, 1211, 1212)}
Context Interaction 5={context:1225, msg-seq(1213)}

Subsequently, diagram 1101 depicts the Administrator reusing an RUI Script. Here, the Administrator may have already performed a few operations/user-interactions starting at 1220 until the time that the Administrator requested to lookup an RUI Script at 1221. As illustrated, this will result in the migration of the state of the admin-console application context to 1222. Hence, it is observed that the state/context of the admin-console application at the time of reuse may not always be the same as that of the initial context of an RUI Script. The intermediate context of the RUI Script must also be recorded along with the initial context, in order to enable contextual search and seamless reuse. While generating RUI Script incrementally, the intermediate admin-console application-context is (re)captured every time a composite-interaction is performed by the user, as further described in FIG. 8 and corresponding text.

While an Administrator is configuring (or working with) a system using the ISC-based admin-console, he/she may require expert advice (or reusable-knowledge) to complete the admin-task. The state/context of the admin-console application at the time of reuse may not always be the same as that of the initial context of an RUI Script. Since the intermediate context is recorded for the RUI Script, it is possible to perform contextual search, as previously described in FIG. 10 and corresponding text. In other words, when the Administrator decides to take help, he/she may already have performed a few operations/user-interactions. As depicted in diagram 1102, this results in the migration of the state of the admin-console application context at the point where the Administrator requests advice. Here, the Administrator may have already performed a few operations/user-interactions starting at 1230 until the time that the Administrator requested to lookup an RUI Script at 1231. As illustrated, this will result in the migration of the state of the admin-console application context to 1222.

One of the preferred implementations of the invention is a client application, namely, a set of instructions (program code) or other functional descriptive material in a code module that may, for example, be resident in the random access memory of the computer. Until required by the computer, the set of instructions may be stored in another computer memory, for example, in a hard disk drive, or in a removable memory such as an optical disk (for eventual use in a CD ROM) or floppy disk (for eventual use in a floppy disk drive). Thus, the present invention may be implemented as a computer program product for use in a computer. In addition, although the various methods described are conveniently implemented in a general purpose computer selectively activated or reconfigured by software, one of ordinary skill in the art would also recognize that such methods may be carried out in hardware, in firmware, or in more specialized apparatus constructed to perform the required method steps. Functional descriptive material is information that imparts functionality to a machine. Functional descriptive material includes, but is not limited to, computer programs, instructions, rules, facts, definitions of computable functions, objects, and data structures.

While particular embodiments of the present invention have been shown and described, it will be obvious to those skilled in the art that, based upon the teachings herein, that changes and modifications may be made without departing from this invention and its broader aspects. Therefore, the appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

What is claimed is:

1. A method implemented by a computer system comprising:
capturing a first admin-console context corresponding to a plurality of first graphical user interface elements displayed on a first graphical user interface, the first admin-console context including a plurality of first admin-console portlet state attributes corresponding to the plurality of first graphical user interface elements;
recording, in a memory area subsequent to capturing the first admin-console context, a plurality of events that occur on the first graphical user interface corresponding to the plurality of first graphical user interface elements;
storing a first Reusable User Interaction (RUI) Script, which includes the captured first admin-console context and the recorded plurality of events, in a library that includes a plurality of RUI scripts;
capturing a second admin-console context in response to receiving an assistance request, wherein the second admin-console context corresponds to a plurality of second graphical user interface elements, the second admin-console context including a plurality of second admin-console portlet state attributes corresponding to the plurality of second graphical user interface elements;

analyzing the second admin-console context against a plurality of admin-console contexts corresponding to each of the plurality of RUI Scripts, wherein the plurality of RUI Scripts includes the first RUI script, the analyzing further comprising:

matching a set of child elements included in the second admin-console context to a plurality of sets of child elements each included in the plurality of admin-console contexts corresponding to the plurality of RUI Scripts, wherein each child element in the set of child elements corresponds to one of the plurality of admin-console portlet state attributes, and the analyzing is performed by processing a radix-tree corresponding to the set of child elements included in the second admin-console context; and computing a score based on the matching of the set of child elements that signifies a number of matching child elements;

identifying the first RUI script based on the analysis; and executing the first RUI script in response to the identifying.

2. The method of claim 1 further comprising:

displaying a set of RUI Script options based on the identifying;

receiving a selection from the user, wherein the selection corresponds to the first RUI script;

retrieving a set of steps corresponding to the first RUI Script; and executing the retrieved set of steps at the second admin-console.

3. The method of claim 2 further comprising:

identifying a starting step of the first RUI Script based upon the second admin-console context, wherein the starting step is after the first step of the selected RUI Script, wherein the executing commences execution of the retrieved set of steps at the identified starting step.

4. The method of claim 1 further comprising:

transmitting the first RUI Script to a hosting computer system, wherein the hosting computer system stores the transmitted first RUI Script in the library, and wherein the plurality of RUI Scripts included in the library are received from a plurality of admin-consoles operating on a plurality of computer systems that includes the hosting computer system.

5. The method of claim 4 further comprising:

receiving, at the hosting computer system, metadata corresponding to one or more of the plurality of RUI Scripts, wherein the metadata includes human-readable text describing the plurality of RUI Scripts; and storing the metadata at the hosting computer system so that the metadata can be browsed by a second user seeking assistance by downloading a set of the plurality of RUI Scripts based on the second admin-console context corresponding to the admin-console being operated by the second user.

6. An information handling system comprising:

one or more processors;

a memory that is accessible by at least one of the processors;

a nonvolatile data storage medium accessible by at least one of the processors; and a set of instructions executed by the selected processor in order to perform actions of:

capturing a first admin-console context corresponding to a plurality of first graphical user interface elements displayed on a first graphical user interface, the first admin-console context including a plurality of first admin-console portlet state attributes corresponding to the plurality of first graphical user interface elements;

recording, in the nonvolatile storage medium subsequent to capturing the first admin-console context, a plurality of events that occur on the first graphical user interface corresponding to the plurality of first graphical user interface elements; storing a first Reusable User Interaction (RUI) Script, which includes the captured first admin-console context and the recorded plurality of events, in a library that includes a plurality of RUI scripts;

capturing a second admin-console context in response to receiving an assistance request, wherein the second admin-console context corresponds to a plurality of second graphical user interface elements, the second admin-console context including a plurality of second admin-console portlet state attributes corresponding to the plurality of second graphical user interface elements;

analyzing the second admin-console context against a plurality of admin-console contexts corresponding to each of the plurality of RUI Scripts, wherein the plurality of RUI Scripts includes the first RUI script, the analyzing further comprising:

matching a set of child elements included in the second admin-console context to a plurality of sets of child elements each included in the plurality of admin-console contexts corresponding to the plurality of RUI Scripts, wherein each child element in the set of child elements corresponds to one of the plurality of admin-console portlet state attributes, and the analyzing is performed by processing a radix-tree corresponding to the set of child elements included in the second admin-console context; and computing a score based on the matching of the set of child elements that signifies a number of matching child elements;

identifying the first RUI script based on the analysis; and and executing the first RUI script in response to the identifying.

7. The information handling system of claim 6 wherein the actions further comprise:

displaying a set of RUI Script options based on the identifying;

receiving a selection from the user, wherein the selection corresponds to the first RUI script; retrieving a set of steps corresponding to the first RUI Script; and executing the retrieved set of steps at the second admin-console.

8. The information handling system of claim 7 wherein the actions further comprise:

identifying a starting step of the first RUI Script based upon the second admin-console context, wherein the starting step is after the first step of the selected RUI Script, wherein the executing commences execution of the retrieved set of steps at the identified starting step.

9. The information handling system of claim 6 wherein the actions further comprise:

transmitting the first RUI Script to a hosting computer system, wherein the hosting computer system stores the transmitted first RUI Script in the library, and wherein the plurality of RUI Scripts included in the library are received from a plurality of admin-consoles operating on a plurality of computer systems that includes the hosting computer system.

10. The information handling system of claim 9 wherein the actions further comprise:

receiving, at the hosting computer system, metadata corresponding to one or more of the plurality of RUI Scripts, wherein the metadata includes human-readable text describing the plurality of RUI Scripts; and storing the metadata at the hosting computer system so that the metadata can be browsed by a second user seeking assistance by downloading a set of the plurality of RUI Scripts based on the second admin-console context corresponding to the admin-console being operated by the second user.

11. A computer program product stored in a computer readable storage medium comprising hardware having computer program product code embodied therewith that, when executed by an information handling system, causes the information handling system to perform actions that include:

capturing a first admin-console context corresponding to a plurality of first graphical user interface elements displayed on a first graphical user interface, the first admin-console context including a plurality of first admin-console portlet state attributes corresponding to the plurality of first graphical user interface elements;

recording, in a memory area subsequent to capturing the first admin-console context, a plurality of events that occur on the first graphical user interface corresponding to the plurality of first graphical user interface elements;

storing a first Reusable User Interaction (RUI) Script, which includes the captured first admin-console context and the recorded plurality of events, in a library that includes a plurality of RUI scripts; capturing a second admin-console context in response to receiving an assistance request, wherein the second admin-console context corresponds to a plurality of second graphical user interface elements, the second admin-console context including a plurality of second admin-console portlet state attributes corresponding to the plurality of second graphical user interface elements;

analyzing the second admin-console context against a plurality of admin-console contexts corresponding to each of the plurality of RUI Scripts, wherein the plurality of RUI Scripts includes the first RUI script, the analyzing further comprising:

matching a set of child elements included in the second admin-console context to a plurality of sets of child elements each included in the plurality of admin-console contexts corresponding to the plurality of RUI Scripts, wherein each child element in the set of child elements corresponds to one of the plurality of admin-console portlet state attributes, and the analyzing is performed by processing a radix-tree corresponding to the set of child elements included in the first second admin-console context; and computing a score based on the matching of the set of child elements that signifies a number of matching child elements;

identifying the first RUI script based on the analysis; and executing the first RUI script in response to the identifying.

12. The computer program product of claim 11 further comprising:

displaying a set of RUI Script options based on the identifying;

receiving a selection from the user, wherein the selection corresponds to the first RUI script;

retrieving a set of steps corresponding to the first RUI Script; and executing the retrieved set of steps at the second admin-console.

13. The computer program product of claim 12 further comprising:

identifying a starting step of the first RUI Script based upon the second admin-console context, wherein the starting step is after the first step of the selected RUI Script, wherein the executing commences execution of the retrieved set of steps at the identified starting step.

14. The computer program product of claim 11 further comprising:

transmitting the first RUI Script to a hosting computer system, wherein the hosting computer system stores the transmitted first RUI Script in the library, and wherein the plurality of RUI Scripts included in the library are received from a plurality of admin-consoles operating on a plurality of computer systems that includes the hosting computer system.

\* \* \* \* \*